United States Patent [19]

Tachuk et al.

[11] Patent Number: 4,985,916

[45] Date of Patent: Jan. 15, 1991

[54] PARTY LINE CONVERTER

[75] Inventors: Leo Tachuk; Michael K. Tulley, both of Alberta, Canada

[73] Assignee: Trison Telecommunications Ltd., Alberta, Canada

[21] Appl. No.: 430,126

[22] Filed: Nov. 1, 1989

[51] Int. Cl.[5] ...................... H04M 1/70; H04M 13/00
[52] U.S. Cl. .................................. 379/178; 379/184; 379/179; 379/180
[58] Field of Search ............... 379/161, 177, 184, 178, 379/179, 180, 182, 186, 187, 183

[56] References Cited

U.S. PATENT DOCUMENTS 4,219,700 8/1980 Panizzon et al. .................... 379/184

Primary Examiner—Stafford D. Schreyer
Attorney, Agent, or Firm—Anthony R. Lambert

[57] ABSTRACT

A telephone subscriber interface device provides privacy on a party line. The device provides for revertive calling, break-in, automatic disconnect, selective ringing, automatic number identification, and operates on the central office power supply. The device provides the following features: A connect state for the PLC in which the PLC is connected to the telephone line but in which the PLC is not responsive to other inputs, a ring decoder which detects either divided coded ringing signals or divided ringing signals in a novel manner, means for testing whether a revertive call has been properly terminated, a low power switch so that the PLC can run on telephone line power only without battery backup, and means for resetting the PLC to a ready state in the absence of other inputs.

11 Claims, 3 Drawing Sheets

PARTY LINE CONVERTER

FIELD OF THE INVENTION

This invention relates to a telephone subscriber interface device for connecting a subscriber station to a telephone line, and more particularly to a telephone subscriber interface device for connecting a subscriber to a party line in such a manner that the telephone subscriber is given approximately the same convenience and degree of privacy as a subscriber on a private line.

BACKGROUND OF THE INVENTION

This invention is an improvement on the station set interface circuits (referred to here generally as telephone subscriber interface devices) described in Canadian Patent No. 1,202,740 to Cruder et al (referred to here as "Cruder") and U.S. Pat. No. 4,219,700 to Panizzon et al (referred to here as "Panizzon"). Both describe telephone subscriber interface devices which include the following features.

1. Privacy. When another party on the party line is off-hook, the subscriber receives a busy tone and is disconnected from the telephone line (see Cruder, page 10 and Panizzon, column 9).
2. Means for breaking-in. On a subscriber going off-hook, while other parties are using the party line, the subscriber receives a busy tone indicating that the telephone line is in use. The subscriber may break-in by manually hanging up briefly (hook-flash). While the subscriber is connected to the line, the other parties receive a signal indicating the invasion of privacy (Cruder page 11, Panizzon column 9).
3. Means for making calls to parties on the same party line (revertive calls). (See Cruder, page 12 and Panizzon, columns 11 and 12).
4. Means for terminating a revertive call that is not completed (Cruder, page 13).
5. Means for detecting and decoding coded ringing signals for the subscriber station without there being audible ringing at the subscriber station for every call to other parties on the party line. (Cruder, page 16 and Panizzon, columns 15 to 20).

The present invention (the "PLC") includes all of these features but provides them in an improved way together with other features The PLC utilizes a state machine of the Mealy type with peripheral circuitry. A Mealy state machine is a device whose output and next state are a function of both the present state and inputs. The state machine is embodied in a logic IC including a gate array in which the logic of the PLC is carried out. The peripherals include a line detector for detecting the busy status of a telephone line, a hook detector for detecting whether the telephone subscriber is off-hook, a ring detector for detecting the presence of ring signals on a telephone line, a tone generator for applying a busy tone to the subscriber station (and not the telephone line) and other circuitry to be described later in this patent.

The PLC also includes the following features not incorporated in the prior art.

1. A connect state for the PLC in which the PLC is connected to the telephone line but in which the PLC is not responsive to other inputs;
2. A ring decoder which detects either divided coded ringing signals or divided ringing signals in a novel manner;
3. Means for testing whether a revertive call has been properly terminated;
4. A low power switch so that the PLC can run on telephone line power only without battery backup; and
5. A limited current source for the telephone subscriber and which draws power from the telephone line for isolating the busy tone from the telephone subscriber.

These and other advantages of the present invention are described in greater detail in the description.

SUMMARY OF THE INVENTION

In one particular embodiment, the present invention is a telephone subscriber interface device for connecting a subscriber station to a telephone line, the interface device comprising:

a line detector connected to the telephone line for generating a line-busy signal in response to the telephone line being busy and a line-free signal in response to the telephone line being free;

a hook detector connected to the subscriber station for generating an on-hook signal in response to the subscriber station being on-hook and an off-hook signal in response to the subscriber station being off-hook;

a ring detector connected to the telephone line for generating a ring signal in response to the presence of ring signals on the telephone line and a no-ring signal in response to the absence of ring signals on the telephone line;

control means connected to the line detector, the hook detector and the ring detector, the control means having a ready state in which the control means has no active outputs and a first connect state accessible from the ready state in response to receiving a line-free signal, an off-hook signal, and a no-ring signal for a pre-determined period of time;

the control means including means for generating a connect signal when the control means is in the connect state;

connect means connected to the control means for connecting the subscriber station to the telephone line in response to the connect signal;

the control means having a monitor state accessible from the connect state in response to receiving a line free signal and a pre-determined signal from the subscriber station, the connect state being accessible from the monitor state in response to receiving a line busy signal, an off-hook signal, and a no-ring signal;

the subscriber station being disconnected from the telephone line when the control means is in the monitor state;

a ring indicator connected to the telephone line for generating a signal in response to the presence of ring signals on the telephone line from a called subscriber; and reset means for resetting the control means to the ready state in response to receiving an on-hook signal from the hook detector, a line-free signal from the line detector, and a no-ring signal from the ring detector.

Further embodiments of invention are set out in the claims forming a part of this patent.

BRIEF DESCRIPTION OF THE DRAWINGS

Preferred embodiments of the invention will now be described by way of example, without intending to limit the scope of the claims, with reference to the figures in which:

DESCRIPTION OF THE PREFERRED EMBODIMENTS

Figure 1A:
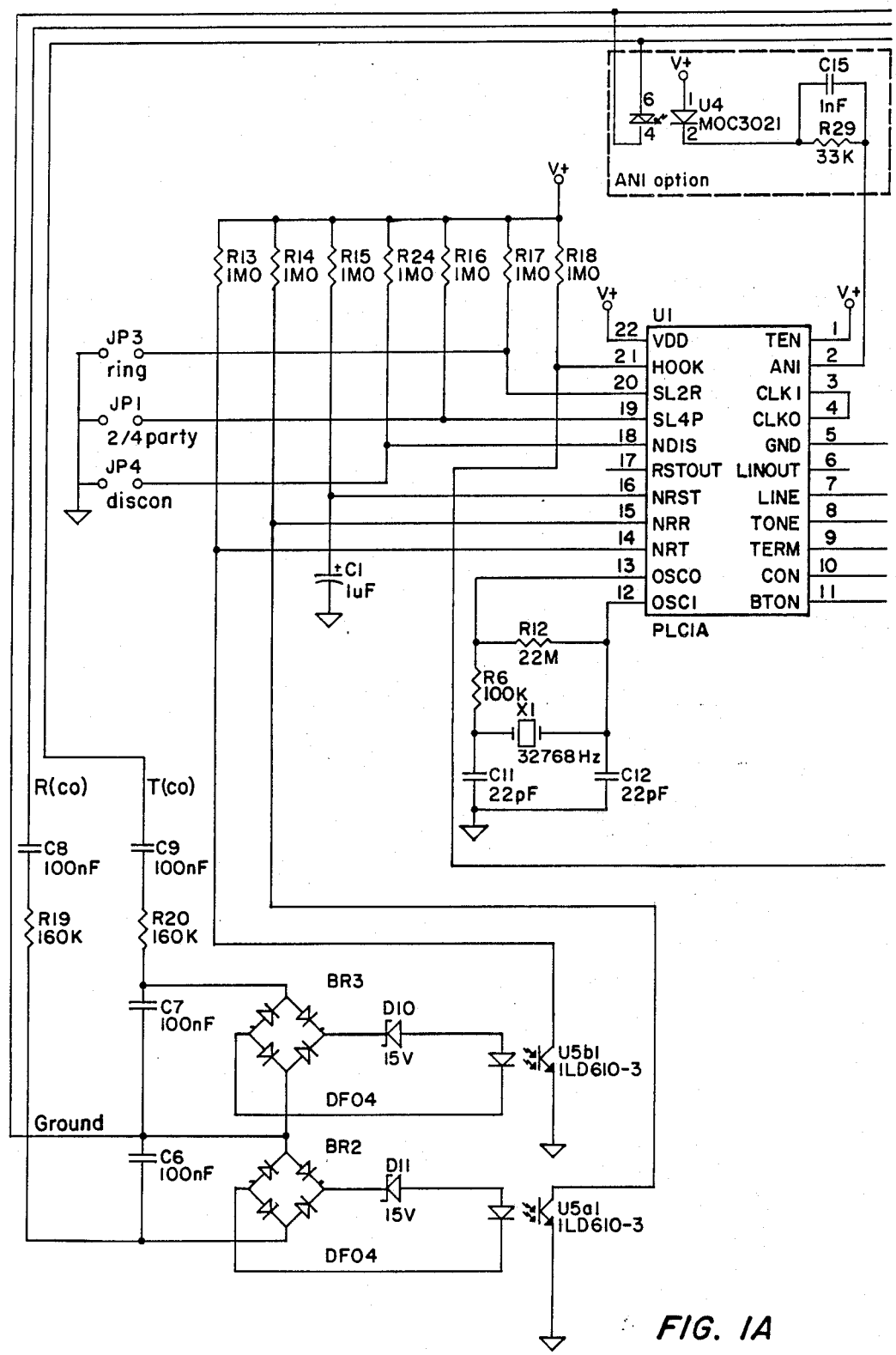
FIG. 1 is a schematic of the internal circuitry of the PLC showing peripherals without circuitry of the logic IC.

The PLC is a telephone subscriber interface device which simulates private line service on a party line. The design described here is for either 2-line or 4-line party lines, but the device may be modified to accommodate further lines. The PLC is designed to be located at the subscriber station, but may be located at the central office or at an intermediate location as a bridge lifter for two party lines.

The specific application described here is designed for location at the subscriber station. The subscriber telephone set will be referred to as the subscriber station, and the subscriber will also be referred to as the third party when the party line is in use. All other parties on the same line will be referred to as party or parties. The central switching office will be referred to as the central office.

OPERATION OF THE PLC

All subscribers on a multi-party service ("MPS") line must be equipped with a PLC. The presence of equipment hooked directly to tip and/or ring of an MPS line without a PLC may render any PLC on that line inoperable.

The PLC senses a ringing signal to the subscriber between ground and tip or ring. When the subscriber's ring has been decoded (after one ringing cycle) the subscriber's equipment is connected to tip and ring. The subscriber's equipment can be standard urban (two-wire) equipment, including answering machines, wireless telephones, facsimile machines or modems.

The PLC draws the small amount of current needed for its operation from the DC voltage on the line. All of its logic functions are performed by one CMOS application specific integrated circuit. Its internal clock and timing surface are controlled by a 32,768 Hz crystal for accuracy and temperature stability.

FEATURES OF THE PLC

Selective Ringing

Divided coding ringing on the line is converted to bridged ringing, allowing ring signals to reach only the called party. This feature is also active in revertive calling.

Call Privacy

100% privacy is provided. When the line is in use, a third party going off-hook will experience a busy tone.

Emergency Break-in

Break-in on the line is activated by the third party remaining off-hook for 16 seconds. After this period the third party will break in on the line, accompanied by a momentary tone burst which will repeat every 1.5 seconds and continue until the third party hangs up the receiver The break-in tone notifies the first two parties .hat their privacy is compromised, yet allows a third party to request access to the telephone network The break-in tone does not interfere with computer modem data transmission.

Revertive Call Answer

To allow the use of standard telephone subscriber sets and associated equipment, the PLC provides for revertive calls (calls to another party on the same line) without the use of the traditional plunger switch of the rural MPS telephone, thus eliminating the need for special rural telephones.

When placing a revertive call, the subscriber will get a busy tone after dialing. On hearing this, the subscriber momentarily hangs up (flashes the hook switch). This places the PLC into a state which allows the exchange to ring the called party and provides a ringback tone to allow the subscriber to hear the ring in their receiver. When the called party goes off-hook to answer their ring, the subscriber is automatically put into an off-hook state as well and the call is complete.

Revertive Call Disconnect

If a revertive call is placed and not answered, the ringing sequence on the line is automatically terminated when the calling party hangs up.

Central Office Initiated Fault Disconnect

An off-hook subscriber may be temporarily disconnected by a signal from the central office, allowing the MPS line to be used by the other parties in the event of a fault condition at one party. The disconnect signal is an interuption of battery for not less than one full second and not more than ten. This would normally be implemented after a message and a howler tone had been placed on a line with an uncompleted call fault. The disconnect condition is automatically reset when the telephone set at the disconnected PLC goes on-hook.

Ring Lockout

When a ring signal is occurring on the party line but has not yet been decoded, all four parties are locked out. This prevents a subscriber from going off-hook and inadvertently answering a call for another party.

Ringer Load

On an incoming call, the PLC does not connect subscriber's telephones or other equipment to the line until that subscriber s ring has been decoded. The total ringer load is only the ringer load of the subscriber actually being rung plus the ringer load of the four PLC's on the line.

Inherent Line Balance

The PLC connects the subscriber equipment from tip to ring. There are no ringers connected from tip or ring to ground unbalancing the line, and no ring isolators are required.

Two/Four Party MPS

The PLC may be internally strapped for either two or four party MPS service. In two party mode it converts divided ringing to bridged ringing. In four party mode it converts divided coded (code 1 or code 2) ringing to bridged ringing, absorbing the first ring of the ringing sequence in order to determine the code. The ringing detection and decoding is broadly frequency selective, accepting a ringing frequency range of 13 Hz to 33 Hz.

Automatic Number Identification

The PLC responds to standard two-party Automatic Number Identification (ANI) systems in the two-party mode.

DESCRIPTION OF PLC SCHEMATIC

Figure 1B:
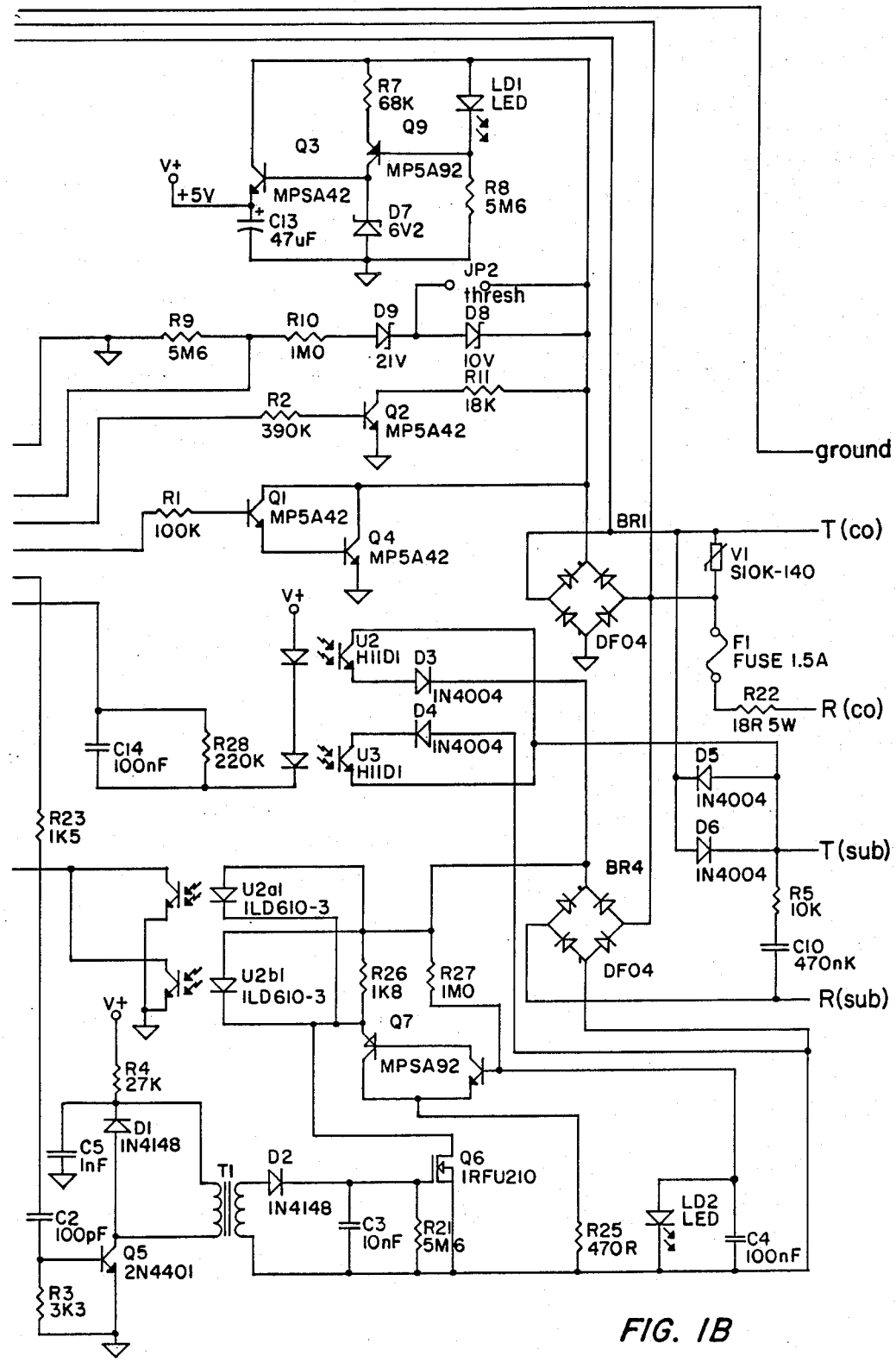

FIG. 1 shows a schematic drawing of the PLC. The PLC consists of a semi-custom gate array logic IC surrounded by supporting circuitry which provides singal conditioning, power supply, and output functions. The logic IC itself will be described later in this patent.

External Connections

The R(co) terminal connects to one conductor of the central office signal pair. This should be the side on which the divided ring signal occurs which the PLC is intended to decode as its own ring.

The T(co) terminal connects to the other conductor of the central office signal pair The R(sub) terminal connects to one conductor of the signal pair to the subscriber equipment (telephone sets, answering machine, etc.).

The T(sub) terminal connects to the other conductor of the signal pair to the subscriber equipment.

The Ground terminal connects to the ground terminal of the protector housing It is used only in detection of divided ringing, and does not serve as a ground or common to the circuit.

Input Protection Circuitry

The R(co) terminal connects to R22, an 18 ohm 3 W wire-wound resistor which serves to limit the current of any surges caused by lightning or other fault conditions. A 1.5 Amp fuse F1 limits fault current of longer duration, such as power cross (short to AC power line). A 140 volt metal-oxide varistor V1 is connected from this fuse to the T(co) terminal to clamp the voltage excursions during surges.

A 470 nF 250 V mylar capacitor C10 and a 10 kohm resistor R5 are connected in series between R(sub) and T(sub). They appear as a small proportion of the ringer load to prevent the transients which would occur on a totally unloaded line from being falsely detected as ring signals. This snubber circuit is actually necessary only when the ringer load of the subscriber's telephone approaches zero, as would be the case when the subscriber's only telephone is an answering machine or wireless phone.

Main Bridge Rectifier and Power Supply

BR1 is a 400 PIV 1 amp bridge rectifier which supplies DC to power the PLC. It also allows much of the input and output peripheral circuitry to be monopolar rather than bipolar. The AC terminals of the bridge are connected to varistor V1 and receive power from R(co) and T(co). The negative side of the bridge is connected to the PLC internal circuit common.

The voltage regulator provides 5.0 to 5.5 volts DC to all points labelled V+ in the circuit through VDD. It uses an NPN transistor series-pass element Q3 with a 6.2 volt zener D7 from its base to common. A current source consisting of PNP transistor Q9, resistor R7, light emitting diode LD1 and resistor R8 supply a stable current to zener D7 over the wide range of on-hook and off-hook subscriber line voltages LED LD1 provides a stable reference voltage of approximately 1.4 volts. The output of capacitor C13 of 47 uF is sufficiently large to support the PLC for brief interruptions of battery from the central office switcher. The regulator is designed principally for low quiescent current.

Oscillator

A 32,768 Hz oscillator X1 provides the clock signal for the logic IC. It uses an internal low-power oscillator cell for the logic IC, brought out at OSCO and OSCI, and a lower power miniature crystal XI with resistors R6 and R12 and capacitors C11 and C12. The output of the oscillator is divided down within the logic IC to supply the 64 Hz logic clock and other frequencies required for busy tone, ring-back and break-in beep generation. The 64 Hz clock frequency appears at CLKO and is connected directly to the logic IC clock input, CLKI.

Ring Detector

There are two identical ring detector circuits in the PLC. One senses a ring R signal between the R(co) and Ground terminals, and the other senses a ring T signal between the T(co) and Ground terminals. The detectors use a dual optocoupler U5 (U5a1 and U5b1) to isolate the ring signals, which are referenced to Ground, from the PLC circuitry's internal common. 15 volt zener diodes D10 and D11 in series with the LED of each opto-coupler increases the ring detection threshold to approximately 40 Vrms. The 0.1 uF 250 V mylar capacitors C8 and C9 block any DC from the detector, and the 160K resistors R19 and R20 limit current through the detector and form part of a high frequency roll-off circuit with the 100 nF 50 V ceramic capacitors C6 and C7 to reduce sensitivity to 60 Hz and its harmonics. The bridge rectifiers BR2 and BR3 serve as full-wave rectifiers which double the effective repetition rate of the ring signal (to approximately 40 pulses per second) and allow the optocoupler to serve as a bipolar detector. The output transistors of the optocouplers have 1M pull-up resistors R13 and R14 for low current consumption and high sensitivity. They are connected to the NRR and NRT inputs of the logic IC. The NRR and NRT signals are low when a ring signal is present between R(co) and Ground or T(co) and Ground respectively.

An attentive ring detector detects the frequency of the ring signals, which may, for that purpose, be frequency encoded.

Line Detector

The line detector senses the DC voltage on the line between the T(co) and R(co) terminals of the PLC. This is used as an indication of line busy or available. Jumper JP2, around zener D8, in conjunction with zener D9, is used to select different sensing thresholds for sensing of a busy line at different line on-hook voltages A resistive voltage divider R9 and R10 scales the input threshold of the LINE input of the logic IC. The LINE signal is low when the line is busy.

Reset Circuit

The reset circuit is a single one second RC time constant using a 1 Mohm resistor R15 and a 1 uF capacitor C1 at the NRST input of the logic IC.

Connect Switch

The subscriber set is connected to the central office line by connecting the R(co) terminal to the R(sub) terminal of the PLC. Loop and voice current pass from R(co) through the 18 ohm surge limiting resistor R22, fuse F1, rectifier BR4, the hook detector dual optocoupler U2 (U2a1 and U2G1), and the FET switch Q6 to the R(sub) terminal. Optocoupler U2 is a dual device with the two devices connected in parallel for higher surge current capability.

When the logic of the PLC is in a state in which the subscriber is connected to the central office line, a square wave of 8192 Hz is present at the CON output of the logic IC. This square wave is differentiated by C2, giving pulses of approximately 300 usec in duration. These pulses turn on transistor Q5, which, at each pulse, discharges capacitor C5 through the primary of transformer T1. The pulses which result in the secondary of transformer T1 are rectified by diode D2 and capacitor C3. This causes a positive gate-to-source voltage on FET switch Q6, turning it on. When the logic is no longer in a connect state and the square wave is absent from the CON output of the logic IC, resistor R21 discharges capacitor C3 and FET switch Q6 turns off.

An alternative low power switch, useful for reducing the insertion loss due to the PLC, would use a two coil latching relay. If the PLC is installed as a bridge lifter at a central office, then the PLC may be modified to run on central office power.

Hook Detector

The hook detector is an optocoupler isolated current sensor. The off-hook current passes through the LEOs of the dual optocoupler U2 when the subscriber set is off-hook. The output transistors of the optocouplers have a common 1 Mohm collector resistor R18. Two optocouplers in parallel are used to sustain higher surge currents The HOOK signal is high if the subscriber set is on-hook.

A current source applies a voltage to the subscriber set in the disconnected state and permits a limited current flow (1.5 to 2 mA) when the subscriber set is off-hook. It consists of NPN transistor Q8, PNP transistor Q7, LED LD2, resistor R25, and resitor R27. This limited off-hook current allows the connect switch to sense a subscriber set off-hook when the connect switch is not turned on. The limited current is not sufficient to present an off-hook condition to the central switching office or permit operation of the subscriber set. The fact that it is a constant current prevents the busy tone which is applied to the subscriber's set from appearing on the central office line where it could be heard by other subscribers. It also prevents the voice signal on the line from being audible to the subscriber who is off-hook but not connected.

Terminate Circuit

In the TERMINATE 1 or TERMINATE 2 state (as described below in the section on the Logic IC), the TERM output of the logic IC is high, turning on a pair of NPN transistors Q1 and Q4 through resistor R1 in darlington connection and placing a 30 mA load briefly on the output of BR1. This is seen by the central switching office as 30 mA of loop current, and is used to trip the ring of an unanswered revertive call.

Clock Signal

The CLKO output of the logic IC is a 64 Hz clock signal which is connected directly to the CLKI input. This signal is brought out to simplify testing of the logic IC.

Fault Disconnect Enable

Jumper JP4, if connected, enables the disconnect feature, which allows the central office switch to force the PLC to a disconnected state when the subscriber set is off-hook by removing battery for one second. The disconnect signal appears at NDIS. Resistor R24 limits the current. This signal may be used in the case of an uncompleted call, after message and howler tone have been applied to the line. The PLC remains disconnected until the subscriber set is replaced on-hook.

Break-In Tone

In the BREAK-IN state as described below, the break-in tone bursts are present at the TONE output of the logic IC. These are amplified and fed to the line by resistor R2, NPN transistor Q2 and resistor R11. This results in a modulation of the current drawn by the PLC such that all parties hear the break-in tone bursts.

Busy Tone

In the BUSY and DISCONNECT states as described below, the busy tone signal is present at the BTON output of the logic IC. In these states, the subscriber set is off-hook and receiving a limited current from the current source in the hook detector circuit. The BTON output drives the two optocouplers U3 and U4 which shunt current from the subscriber set through diodes D3 and D4. This produces an audible busy tone in the subscriber set. It does not impose an audible signal on the central office line or the other parties because of the constant current through the hook detector current source.

Ring Code Selection

If jumber JP3 is connected, the SL2R input of the logic IC is connected to common with 1M resistor R17, and the PLC will detect a code 1 (single burst) ring. If JP3 is disconnected, the PLC will detect a code 2 (double burst) ring. This selection is relevant only if the PLC is in 4-party mode If jumper JP1 is connected, the SL4P input of the logic IC is connected to common with 1M resistor R16 and the PLC will function in 2-party mode, detecting divided ringing only. If JP1 is disconnected, the PLC will function in 4-party mode, detecting divided coded ringing.

Test Provision

Outputs RSTOUT and LINEOUT and input TEN of the logic IC are used only in testing of the logic and do not play an active part in the function of the PLC.

Automatic Number Identification (ANI)

The PLC will respond to a ground-mark ANI interrogate signal from the central office if it is in two-party mode (jumper JP1 connected) and in the CONNECT 1 state as described below. The ANI output of the logic IC is high, turning on optocoupler U4 and connecting the T(co) and ground terminals for approximately one-half second. This signal allows the central office ANI equipment to determine which subscriber on a two-party line is off-hook.

Logic

All of the logic functions of the PLC are performed by an application-specific integrated circuit referred to as the logic IC. This is a semi-custom CMOS gate array. Its functions are described in the following.

Figure 2:
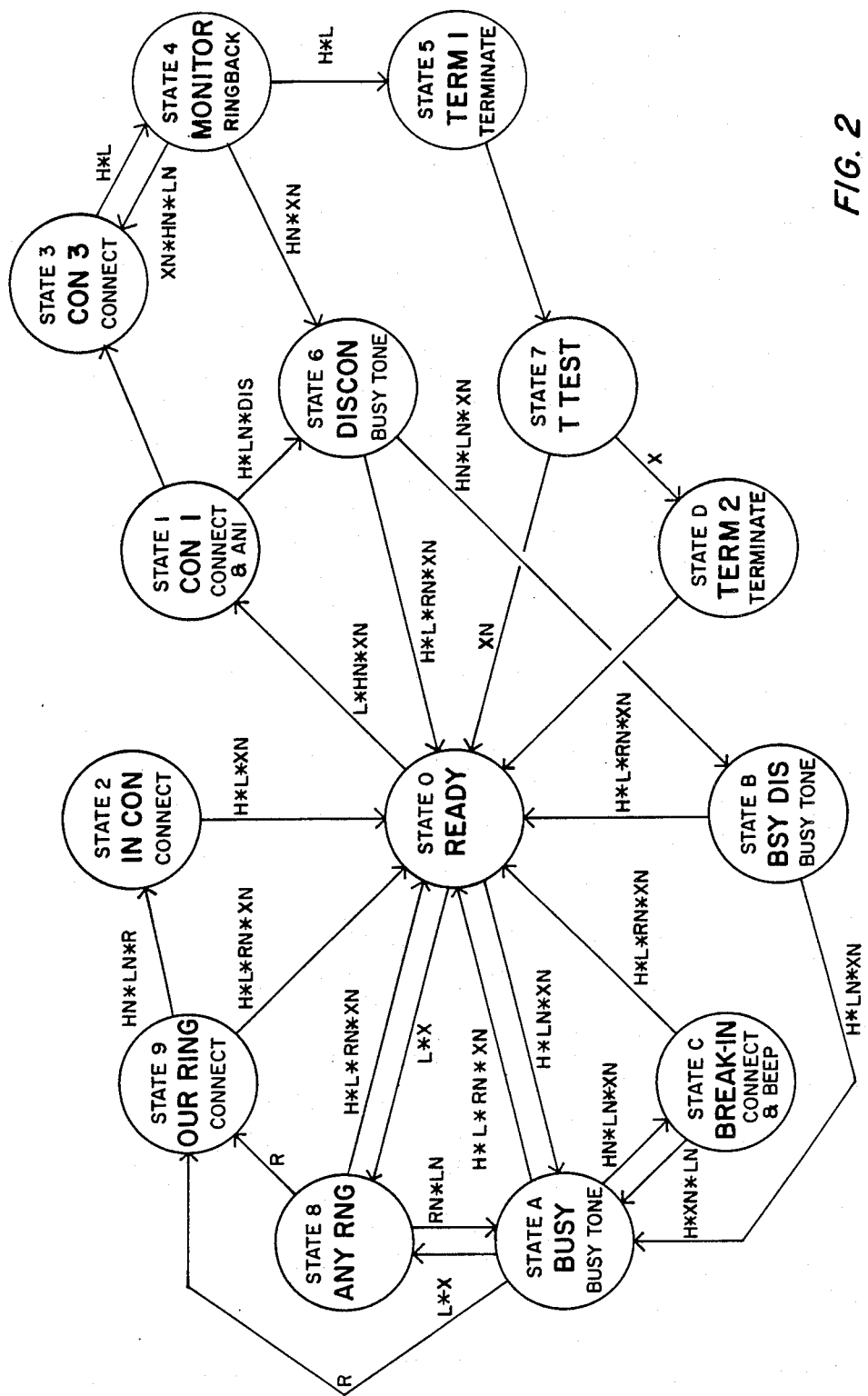
FIG. 2 is a state diagram of the logic IC.

The logic of the PLC, as contained in the custom logic IC, is best understood as a state machine of the Mealy type. This is a device whose outputs and next state are functions of both the present state and the inputs. The following tables list the inputs, outputs, and states of the logic IC. The states are illustrated in FIG. 2, to which reference should be made in understanding the description.

| Input | Function |
| --- | --- |
| NRST | resets PLC to ready state |
| HOOK | 0 (low) indicates subscriber off-hook |
| TEN | test enable, not used in operation |
| LINE | 0 (low) indicates line busy |
| NRR | 0 (low) indicates ring signal present between T(co) and G |
| NRT | 0 (low) indicates ring signal present between R(co) and G |
| OSCI | oscillator input (32,768 Hz) |
| SL2R | select code 1 (low) or code 2 (high) ring |
| SL4P | select 2-party (low) or 4-party (high) mode |
| NDIS | fault disconnect disable (high disables feature) |
| CLKI | clock input (64 Hz) |

| Output | Function |
| --- | --- |
| ANI | high if ANI pulse detected |
| RSTOUT | test, not used in operation |
| LINOUT | test, not used in operation |
| CON | connect, 8192 Hz square wave connects subscriber to central office line |
| TERM | terminate, high to load line and trip ring |
| CLKO | clock output, 64 Hz (not a function of state machine) |
| OSCO | oscillator output, 32768 Hz |
| TONE | break-in tone output |
| BTON | busy tone output |

| State | Name | Next State | Outputs |
| --- | --- | --- | --- |
| 0 | READY | 1, 8 or A | none |
| 1 | CONNECT 1 | 3 | CON, ANI if present |
| 2 | INCOMING CONNECT | 0 | CON |
| 3 | CONNECT 3 | 4 | CON |
| 4 | MONITOR | 3, 5, or 6 | BTON for ringback |
| 5 | TERMINATE 1 | 7 | TERM |
| 6 | DISCONNECT | 0 | BTON |
| 7 | TERMINATE TEST | 0 or D | none |
| 8 | ANY RING | 0, 9, or A | none |
| 9 | OUR RING | 0 or 3 | CON |
| A | BUSY | 0, 8, 9 or C | BTON |
| B | BUSY DISCONNECT | 0 or A | BTON |
| C | BREAK-IN | 0 or A | TONE, CON |
| D | TERMINATE 2 | 0 | TERM |
| E | not used | 0 | none |
| F | not used | 0 | none |

State 0: READY

This is the idle state for the PLC. No outputs are active. NRST forces the device to this state. There are three possible next states, depending on the inputs.

Next state 1: CONNECT A. Subscriber goes off-hook.

A low HOOK (HN) indicating off-hook and a high LINE (L) indicating not busy and no ring (XN) for 0.3125 second will cause a transition to state 1, CONNECT A.

Next state 8: ANY RING. A ring signal (X) is detected.

A high LINE (L) not busy, combined with a 20 Hz ring of any kind will cause a transition to state 8, ANY RING.

Next state A: BUSY. Other party goes off-hook.

A low LINE (LN) busy and a high HOOK (H) on-hook and no ring for 0.1875 second will cause a transition to state A, BUSY.

State 1: CONNECT 1

This is a temporary connect state, in which the CON output is active and the subscriber is connected to the central office T and R lines It is not affected by any inputs except the clock. After 3.0625 seconds there is a transition to state 3, CONNECT 3. This state exists because certain central office switchers respond erratically to a subscriber going off-hook and create interruptions in the battery which can be difficult to distinquish from a subscriber hook flash.

State 2: INCOMING CONNECT

This is the connect state for incoming calls. It can be reached only by the subscriber going off-hook after an incoming call has been decoded as directed to this PLC and the subscriber has gone off-hook. There is only one possible next state, state 0, READY. This is reached after the subscriber has gone on-hook (H) and the line has gone high (L) and there has been no ringing (XN) for 0.4375 second.

State 3: CONNECT 3

This is the primary connect state for outgoing calls. The device will remain in this state until there is a high HOOK (H) on-hook input and the line goes high (L) for 0.125 second, which will cause a transition to state 4, MONITOR.

State 4: MONITOR

In this state the BTON output is active as ring-back signal only during the ringing on the line. This state allows the subscriber to hear a ring signal on the line, but does not allow the subscriber to draw loop current or establish a talk path. This makes it possible for the subscriber to make a revertive call to another subscriber on the same MPS line. If LINE is low (LN) line busy for 0.4375 second, there will be a transition to state 3, CONNECT C. This would be the result of the called party in a revertive call going off-hook. If HOOK is high (H) and LINE is high (L) indicating that the subscriber is on-hook for 1.1 seconds, there is a transition to state 5, TERMINATE 1. If the PLC remains in MONITOR for 8.3 seconds without the occurrence of any ring signal, there is a transition to state 6, DISCONNECT. This prevents the subscriber from remaining in the MONITOR state unless they are making a revertive call, in which case a ringing signal would be present approximately every 6 seconds.

State 5: TERMINATE 1

In this state the TERM output is active and the PLC attempts to draw 30 mA loop current for 0.4375 second. This ensures that if the subscriber hangs up after an uncompleted revertive call, the line is not left ringing. After 0.4375 second in this state there is a transition to state 7, TERMINATE TEST.

State 6: DISCONNECT

In this state the subscriber is disconnected from the line. The only active output is BTON, and the busy tone is coupled to the subscriber's set. This state is reached when the subscriber either remains in the CONNECT 1 or CONNECT 3 state and the central office switch issues a disconnect command by dropping battery for one second (provided that the fault disconnect feature is enabled with jumper JP4) or the subscriber remains in the MONITOR state with no ringing on the line for 8.3 seconds. There are two possible next states, depending on the inputs.

Next state 0: READY. Subscriber goes on-hook.

A high HOOK (H) indicating on-hook and a high LINE (L) indicating not busy and no ring (XN) for 0.4376 second will cause a transition to state 0, READY.

Next State B: BUSY DISCONNECT. The line goes to busy.

A low LINE (LN) busy, combined with no ringing (XN) and a continued off-hook (HN) condition for 0.4375 second will cause a transition to state B, BUSY DISCONNECT.

State 7: TERMINATE TEST

This state is reached after state 5, TERMINATE 1. The PLC waits for one second for any ringing. If any is detected it goes to state D, TERMINATE 2. If not, it returns to state 0, READY.

State 8: ANY RING

This state is reached when a ring signal (X) appears at either the R(co) or T(co) terminate of the PLC (NRR or NRT low) and the signal is within the range of 13 to 33 Hz. No outputs are active in this state. If the ring is decoded as being for this subscriber (R), there is a transition to state 9, OUR RING. If the ring is not decoded as ours and LINE is low (LN) for 0.1875 second, there is a transition to state A, BUSY. If there is no ringing for 5.6 seconds, there is a return to state 0, READY.

State 9: OUR RING

In this state the CON output is active (the subscriber is connected to the central office line). This state is reached when an incoming ring signal has been decoded as a ring for this subscriber. This decoding depending on the conditions of jumpers JP1 and JP3. If HOOK is low (HN) and the line goes busy (LN) for 0.3125 second (subscriber off-hook) there is a transition to state 2, INCOMING CONNECT. If ringing ceases for 8.625 seconds, there is a transition to state 0, READY.

State A: BUSY

This state is reached when LINE is low (LN) line busy for 0.1875 second and the PLC has been in either state 0, state 8, or state C. In this state the busy tone (BTON) is applied to the subscriber only if HOOK is low (subscriber off-hook). No other outputs are active. If the PLC remains in this state for 16 seconds, there is a transition to state C, BREAK-IN. If the ring signal is decoded as our ring, there is a transition to state 9 OUR RING. If HOOK goes high (subscriber on-hook) for 0.4375 second, the PLC returns to state 0, READY.

State B: BUSY DISCONNECT

This state is reached from state 6, DISCONNECT, when the line goes busy (LN) and the subscriber remains off-hook (HN) for 0.4375 second. The busy tone (BTON) continues to be applied to the subscriber set. The PLC returns to state 0, READY, if the subscriber set is replaced on-hook (H) and the line is not busy (L) and not ringing (XN) for 0.4375 second. If the subscriber set is replaced on-hook (H) and the line is still busy, the PLC goes to State A, BUSY.

State C: BREAK-IN

In this state the CON output is active and the subscriber is connected to the line in spite of the fact that the line is busy. It is reached from state A, BUSY, when HOOK remains low (subscriber off-hook) for 16 seconds. In state C the break-in beep, TONE, is applied intermittently to the line so that all subscribers off-hook can hear it. If HOOK goes high (subscriber on-hook) the LINE is low (line busy) for 0.1875 second, there is a transition to state A, BUSY. If HOOK goes high and LINE is also high (line not busy), there is a transition to state 0, READY.

GATE ARRAY LOGIC

The logic of the PLC IC has been set out in a schedule to this patent but it could be readily prepared by an electrical engineer skilled in systems design from the information provided previously in this patent, particularly the description of the states of the PLC and the state diagram marked as FIG. 2.

It will be understood that the description made here is a preferred embodiment and is not intended to restrict the scope of the claims which define the invention, and which follow. Modifications of the invention which are functionally equivalent to the invention are intended to be covered by the claims.

We claim:

1. A telephone subscriber interface device for connecting a subscriber station to a telephone line, the interface device comprising:
    a line detector connected to the telephone line for generating a line-busy signal in response to the telephone being busy and a line-free signal in response to the telephone line being free;
    a hook detector connected to the subscriber station for generating an on-hook signal in response to the subscriber station being on-hook and an off-hook signal in response to the subscriber station being off-hook;
    a ring detector connected to the telephone line for generating a ring signal in response to the presence of ring signals on the telephone line and a no-ring signal in response to the absence of ring signals on the telephone line;
    control means connected to the line detector, the hook detector and the ring detector, the control means having a ready state in which the control means has no active outputs and a primary connect state accessible from the ready state in response to receiving a line-free signal, an off-hook signal, and a no-ring signal for a pre-determined period of time;
    the control means including means for generating a connect signal when the control means is in the connect state;
    connect means connected to the control means for connecting the subscriber station to the telephone line in response to the connect signal;
    the control means having a monitor state accessible from the primary connect state in response to receiving a line free signal and a pre-determined signal from the subscriber station, the primary connect state being accessible from the monitor state in response to receiving a line busy signal, an off-hook signal, and a no-ring signal;

the subscriber station being disconnected from the telephone line when the control means is in the monitor state;

a ring indicator connected to the telephone line for generating a signal in response to the presence of ring signals on the telephone line from a called subscriber;

reset means for resetting the control means to the ready state in response to receiving an on-hook signal from the hook detector, a line-free signal from the line detector and a no-ring signal from the ring detector;

the control means having an any-ring state in response to the detection of ring signals on the telephone line;

the control means including decoding means connected to the telephone line for decoding the ring signal, the control means having an our-ring state in response to decoding a ring signal coded for the telephone subscriber;

the control means having an incoming connect state accessible from the our-ring state in response to receiving an off-hook signal, a line-busy signal and a ring signal decoded as being for the telephone subscriber;

means connected to the telephone line and the control means for setting the control means to detect a single burst between tip or ring conductors of the telephone line and ground or double burst between tip or ring conductors and ground; and the decoding means including means for detecting a single burst or double burst.

2. A telephone subscriber interface device for connecting a subscriber station to a telephone line, the interface device comprising:

a line detector connected to the telephone line for generating a line-busy signal in response to the telephone being busy and a line-free signal in response to the telephone line being free;

a hook detector connected to the subscriber station for generating an on-hook signal in response to the subscriber station being on-hook and an off-hook signal in response to the subscriber station being off-hook;

a ring detector connected to the telephone line for generating a ring signal in response to the presence of ring signals on the telephone line and a no-ring signal in response to the absence of ring signals on the telephone line;

control means connected to the line detector, the hook detector and the ring detector, the control means having a ready state in which the control means has no active outputs and a primary connect state accessible from the ready state in response to receiving a line-free signal, an off-hook signal, and a no-ring signal for a pre-determined period of time;

the control means including means for generating a connect signal when the control means is in the connect state;

connect means connected to the control means for connecting the subscriber station to the telephone line in response to the connect signal;

the control means having a monitor state accessible from the primary connect state in response to receiving a line free signal and a pre-determined signal from the subscriber station, the primary connect state being accessible from the monitor state in response to receiving a line busy signal, an off-hook signal, and a no-ring signal;

the subscriber station being disconnected from the telephone line when the control means is in the monitor state;

a ring indicator connected to the telephone line for generating a signal in response to the presence of ring signals on the telephone line from a called subscriber;

reset means for resetting the control means to the ready state in response to receiving an on-hook signal from the hook detector, a line-free signal from the line detector and a no-ring signal from the ring detector;

the control means having an any-ring state in response to the detection of ring signals on the telephone line;

the control means including decoding means connected to the telephone line for decoding the ring signal, the control means having an our-ring state in response to decoding a ring signal coded for the telephone subscriber;

the control means having an incoming connect state accessible from the our-ring state in response to receiving an off-hook signal, a line-busy signal and a ring signal decoded as being for the telephone subscriber; and means connected to the telephone line and the control means for setting the control means to detect either divides ringing or divided coded ringing between the tip and ring conductors of the telephone line.

3. The telephone subscriber interface device of claim 1 further including:

means connected to the telephone line and the control means for setting the control means to detect either divided ringing or divided coded ringing between the tip and ring conductors of the telephone line.

4. A telephone subscriber interface device for connecting a subscriber station to a telephone line, the interface device comprising:

a line detector connected to the telephone line for generating a line-busy signal in response to the telephone being busy and a line-free singal in response to the telephone line being free;

a hook detector connected to the subscriber station for generating an on-hook signal in response to the subscriber station being on-hook and an off-hook signal in response to the subscriber station being off-hook;

a ring detector connected to the telephone line for generating a ring signal in response to the presence of ring signals on the telephone line and a no-ring signal in response to the absence of ring signals on the telephone line;

control means connected to the line detector, the hook detector and the ring detector, the control means having a ready state in which the control means has no active outputs and a primary connect state accessible from the ready state in response to receiving a line-free signal, an off-hook signal, and a no-ring signal for a pre-determined period of time;

the control means including means for generating a connect signal when the control means is in the connect state;

connect means connected to the control means for connecting the subscriber station to the telephone line in response to the connect signal;

the control means having a monitor state accessible from the primary connect state in response to receiving a line free signal and a pre-determined signal from the subscriber station, the primary connect state being accessible from the monitor state in response to receiving a line busy signal, an off-hook signal, and a no-ring signal;

the subscriber station being disconnected from the telephone line when the control means is in the monitor state;

a ring indicator connected to the telephone line for generating a signal in response to the presence of ring signals on the telephone line from a called subscriber;

reset means for resetting the control means to the ready state in response to receiving an on-hook signal from the hook detector, a line-free signal from the line detector and a no-ring signal from the ring detector;

the control means having a disconnect state accessible from the monitor state in response to receiving an off-hook signal, a line-free signal for a pre-determined period of time, and a no-ring signal;

the control means having a busy tone output when the control means is in the disconnect state;

a busy tone generator having audible tone output in response to receiving the busy tone output, the audible tone output being isolated from the telephone; and the audible tone output being isolated from the telephone line by a limited current source circuit means connected to the telephone line to receive power from the telephone line and to the subscriber for providing a limited current to the telephone subscriber, the audible tone output being superimposed on the limited current provided to the subscriber.

5. The telephone subscriber interface device of claim 4 further including a tone generator connected to the control means and to the telephone line for producing an audible tone to other off-hook subscribers.

6. A telephone subscriber interface device for connecting a subscriber station to a telephone line, the interface device comprising:

a line detector connected to the telephone line for generating a line-busy signal in response to the telephone being busy and a line-free signal in response to the telephone line being free;

a hook detector connected to the subscriber station for generating an on-hook signal in response to the subscriber station being on-hook and an off-hook signal in response to the subscriber station being off-hook;

a ring detector connected to the telephone line for generating a ring signal in response to the presence of ring signals on the telephone line and no-ring signal in response to the absence of ring signals on the telephone line;

control means connected to the line detector, the hook detector and the ring detector, the control means having a ready state in which the control means has no active outputs and a primary connect state accessible from the ready state in response to receiving a line-free signal, an off-hook signal, and a no-ring signal for a pre-determined period of time;

the control means including means for generating a connect signal when the control means is in the connect state;

connect means connected to the control means for connecting the subscriber station to the telephone line in response to the connect signal;

the control means having a monitor state accessible from the primary connect state in response to receiving a line free signal and a pre-determined signal from the subscriber station, the primary connect state being accessible from the monitor state in response to receiving a line busy signal, an off-hook signal, and a no-ring signal;

the subscriber station being disconnected from the telephone line when the control means is in the monitor state;

a ring indicator connected to the telephone line for generating a signal in response to the presence of ring signals on the telephone line from a called subscriber;

reset means for resetting the control means to the ready state in response to receiving an on-hook signal from the hook detector, a line-free signal from the line detector and a no-ring signal from the ring detector; and the connect means comprising a low power switch electrically isolated from the telephone line by a transformer, the transformer being driven by a high frequency power source derived from the telephone line power and the transformer output charging a capacitor to switch on the low power switch.

7. A telephone subscriber interface device for connecting a subscriber station to a telephone line, the interface device comprising:

a line detector connected to the telephone line for generating a line-busy signal in response to the telephone being busy and a line-free signal in response to the telephone line being free;

a hook detector connected to the subscriber station for generating an on-hook signal in response to the subscriber station being on-hook and an off-hook signal in response to the subscriber station being off-hook;

a ring detector connected to the telephone line for generating a ring signal in response to the presence of ring signals on the telephone line and a no-ring signal in response to the absence of ring signals on the telephone line;

control means connected to the line detector, the hook detector and the ring detector the control means having a ready state in which the control means has no active outputs and a primary connected state accessible from the ready state in response to receiving a line-free signal, an off-hook signal, and a no-ring signal for a pre-determined period of time;

the control means including means for generating a connect signal when the control means is in the connect state;

connect means connected to the control means for connecting the subscriber station to the telephone line in response to the connect signal;

the control means having a monitor state accessible from the primary connect state in response to receiving a line free signal and a pre-determined signal from the subscriber station, the primary connect state being accessible from the monitor state in response to receiving a line busy signal, an off-hook signal, and a no-ring signal;

the subscriber station being disconnected from the telephone line when the control means is in the monitor state;

a ring indicator connected to the telephone line for generating a signal in response to the presence of ring signals on the telephone line from a called subscriber;

reset means for resetting the control means to the ready state in response to receiving an on-hook signal from the hook detector, a line-free signal from the line detector and a no-ring signal from the ring detector;

the control means having an any-ring state in response to the detection of ring signals on the telephone line;

the control means including decoding means connected to the telephone line for decoding the ring signal, the control means having an our-ring state in response to decoding a ring signal coded for the telephone subscriber;

the control means having an incoming connect state accessible from the our-ring state in response to receiving an off-hook signal, a line-busy signal and a ring signal decoded as being for the telephone subscriber; and the connect means comprising a low power switch electrically isolated from the telephone line by a transformer, the transformer being driven by a high frequency power source derived from the telephone line power and the transformer output charging a capacitor to switch on the low power switch.

8. A telephone subscriber interface device for connecting a subscriber station to a telephone line, the interface device comprising:

a line detector connected to the telephone line for generating a line-busy signal in response to the telephone being busy and a line-free signal in response to the telephone line being free;

a hook detector connected to the subscriber station for generating an on-hook signal in response to the subscriber station being on-hook and an off-hook signal in response to the subscriber station being off-hook;

a ring detector connected to the telephone line for generating a ring signal in response to the presence of ring signals on the telephone line and a no-ring signal in response to the absence of ring signals on the telephone line;

control means connected to the line detector, the hook detector and the ring detector, the control means having a ready state in which the control means has no active outputs and a primary connect state accessible from the ready state in response to receiving a line-free signal, an off-hook signal, and a no-ring signal for a pre-determined period of time;

the control means including means for generating a connect signal when the control means is in the connect state;

connect means connected to the control means for connecting the subscriber station to the telephone line in response to the connect signal;

the control means having a monitor state accessible from the primary connect state in response to receiving a line free signal and a pre-determined signal from the subscriber station, the primary connect state being accessible from the monitor state in response to receiving a line busy signal, an off-hook signal, and a no-ring signal;

the subscriber station being disconnected from the telephone line when the control means is in the monitor state;

a ring indicator connected to the telephone line for generating a signal in response to the presence of ring signals on the telephone line from a called subscriber;

reset means for resetting the control means to the ready state in response to receiving an on-hook signal from the hook detector, a line-free signal from the line detector and a no-ring signal from the ring detector;

the control means having a busy state accessible from the ready state in response to receiving a line-busy signal, an on-hook signal, and a no-ring signal for a pre-determined period of time;

a break-in state accessible from the busy state in response to the control means remaining in the busy state for a predetermined period of time, the control means having connect output while in the break-in state; and the connect means comprising a low power switch electrically isolated from the telephone line by a transformer, the transformer being driven by a high frequency power source derived from the telephone line power and the transformer output charging a capacitor to switch on the low power switch.

9. A telephone subscriber interface device for connecting a subscriber station to a telephone line, the interface device comprising:

a line detector connected to the telephone line for generating a line-busy signal in response to the telephone being busy and a line-free signal in response to the telephone line being free;

a hook detector connected to the subscriber station for generating an on-hook signal in response to the subscriber station being on-hook and an off-hook signal in response to the subscriber station being off-hook;

a ring detector connected to the telephone line for generating a ring signal in response to the presence of ring signals on the telephone line and a no-ring signal in response to the absence of ring signals on the telephone line;

control means connected to the line detector, the hook detector and the ring detector, the control means having a ready state in which the control means has no active outputs and a primary connect state accessible from the ready state in response to receiving a line-free signal, an off-hook signal, and a no-ring signal for a pre-determined period of time;

the control means including means for generating a connect signal when the control means is in the connect state;

connect means connected to the control means for connecting the subscriber station to the telephone line in response to the connect signal;

the control means having a monitor state accessible from the primary connect state in response to receiving a line free signal and a pre-determined signal from the subscriber station, the primary connect state being accessible from the monitor state in response to receiving a line busy signal, and off-hook signal, and a no-ring signal;

the subscriber station being disconnected from the telephone line when the control means is in the monitor state;

a ring indicator connected to the telephone line for generating a signal in response to the presence of ring signals on the telephone line from a called subscriber;

reset means for resetting the control means to the ready state in response to receiving an on-hook signal from the hook detector, a line-free signal from the line detector and a no-ring signal from the ring detector; and a regulator connected to the telephone line for creating a fixed voltage source, and the connect means including an oscillator, a transistor having its base connected to the oscillator and its collector connected to the regulator, a transformer connected across the collector and the emitter of the transistor, a rectifier connected across the transformer, a capacitor connected across the transformer and rectifier and a low power switch connected to the capacitor.

10. A telephone subscriber interface device for connecting a subscriber station to a telephone line, the interface device comprising:

a line detector connected to the telephone line for generating a line-busy signal in response to the telephone being busy and a line-free signal in response to the telephone line being free;

a hook detector connected to the subscriber station for generating an on-hook signal in response to the subscriber station being on-hook signal and an off-hook signal in response to the subscriber station being off-hook;

a ring detector connected to the telephone line for generating a ring signal in response to the presence of ring signals on the telephone line and a no-ring signal in response to the absence of ring signals on the telephone line;

control means connected to the line detector, the hook detector and the ring detector, the control means having a ready state in which the control means has no active outputs and a primary connect state accessible from the ready state in response to receiving a line-free signal, an off-hook signal, and a no-ring signal for a pre-determined period of time;

the control means including means for generating a connect signal when the control means is in the connect state;

connect means connected to the control means for connecting the subscriber station to the telephone line in response to the connect signal;

the control means having a monitor state accessible from the primary connect state in response to receiving a line free signal and a pre-determined signal from the subscriber station, the primary connect state being accessible from the monitor state in response to receiving a line busy signal, an off-hook signal, and a no-ring signal;

the subscriber station being disconnected from the telephone line when the control means is in the monitor state;

a ring indicator connected to the telephone line for generating a signal in response to the presence of ring signals on the telephone line from a called subscriber;

reset means for resetting the control means to the ready state in response to receiving an on-hook signal from the hook detector, a line-free signal from the line detector and a no-ring signal from the ring detector;

the control means having an any-ring state in response to the detection of ring signals on the telephone line;

the control means including decoding means connected to the telephone line for decoding the ring signal, the control means having an our-ring state in response to decoding a ring signal coded for the telephone subscriber;

the control means having an incoming connect state accessible from the our-ring state in response to receiving an off-hook signal, a line-busy signal and a ring signal decoded as being for the telephone subscriber;

a regulator connected to the telephone line for creating a fixed voltage source, and the connect means including an oscillator, a transistor having its base connected to the oscillator and its collector connected to the regulator, a transformer connected across the collector and the emitter of the transistor, a rectifier connected across the transformer, a capacitor connected across the transformer and rectifier and a low power switch connected to the capacitor.

11. A telephone subscriber interface device for connecting a subscriber station to a telephone line, the interface device comprising:

a line detector connected to the telephone line for generating a line-busy signal in response to the telephone being busy and a line-free signal in response to the telephone line being free;

a hook detector connected to the subscriber station for generating an on-hook signal in response to the subscriber station being on-hook and an off-hook signal in response to the subscriber station being off-hook;

a ring detector connected to the telephone line for generating a ring signal in response to the presence of ring signals on the telephone line and a no-ring signal in response to the absence of ring signals on the telephone line;

control means connected to the line detector, the hook detector and the ring detector, the control means having a ready state in which the control means has no active outputs and a primary connect state accessible from the ready state in response to receiving a line-free signal, an off-hook signal, and a no-ring signal for a pre-determined period of time;

the control means including means for generating a connect signal when the control means is in the connect state;

connect means connected to the control means for connecting the subscriber station to the telephone line in response to the connect signal;

the control means having a monitor state accessible from the primary connect state in response to receiving a line free signal and a pre-determined signal from the subscriber station, the primary connect state being accessible from the monitor state in response to receiving a line busy signal, an off-hook signal, and a no-ring signal;

the subscriber station being disconnected from the telephone line when the control means is in the monitor state;

a ring indicator connected to the telephone line for generating a signal in response to the presence of ring signals on the telephone line from a called subscriber;

reset means for resetting the control means to the ready state in response to receiving an on-hook signal from the hook detector, a line-free signal from the line detector and a no-ring signal from the ring detector;

the control means having a busy state accessible from the ready state in response to receiving a line-busy signal, an on-hook signal, and a no-ring signal for a pre-determined period of time;

a break-in state accessible from the busy state in response to the control means remaining in the busy state for a predetermined period of time, the control means having connect output while in the break-in state; and a regulator connected to the telephone line for creating a fixed voltage source, and the connect means including an oscillator, a transistor having its base connected to the oscillator and its collector connected to the regulator, a transformer connected across the collector and the emitter of the transistor, a rectifier connected across the transformer, a capacitor connected across the transformer and rectifier and a low power switch connected to the capacitor.

* * * * *